United States Patent [19]
Argersinger et al.

[11] Patent Number: 5,803,506
[45] Date of Patent: Sep. 8, 1998

[54] FLEXIBLE PIPE LOOP

[75] Inventors: Philip B. Argersinger, West Monroe; Robert J. Walsh, Camillus, both of N.Y.

[73] Assignee: Flex-Hose Company, Inc., East Syracuse, N.Y.

[21] Appl. No.: 926,803

[22] Filed: Sep. 10, 1997

[51] Int. Cl.$^6$ .................................................. F16L 55/02
[52] U.S. Cl. ............................ 285/14; 285/223; 285/226
[58] Field of Search .................................. 285/223, 181, 285/144.1, 148.3, 30, 226, 227, 14

[56] References Cited

U.S. PATENT DOCUMENTS

| | | | |
|---|---|---|---|
| 700,378 | 5/1902 | Schmidt | 285/64 |
| 2,030,218 | 2/1936 | Maxwell | 138/61 |
| 2,256,388 | 9/1941 | Fentress | 285/226 X |
| 2,511,335 | 6/1950 | Guarnaschelli | 285/8 |
| 2,929,397 | 3/1960 | Sloan et al. | 137/356 |
| 3,847,184 | 11/1974 | God | 138/121 |
| 4,127,145 | 11/1978 | Erlenmayer et al. | 285/223 X |
| 4,244,543 | 1/1981 | Ericson | 248/55 |
| 5,195,784 | 3/1993 | Richter | 285/61 |
| 5,257,422 | 11/1993 | Ruegg | 4/301 |

*Primary Examiner*—Dave W. Arola
*Attorney, Agent, or Firm*—Trapani & Molldrem

[57] ABSTRACT

A flexible pipe loop for absorbing or compensating for movement in a pipe run, and for reducing stresses in the pipe run. The loop comprises a pair of pipe run elbows, a pair of flexible tube members, a pair of loop elbows, and a third flexible tube member. The pipe run elbows are oppositely disposed, and each has a first open end to be connected to the pipe run, and a second open end. The pair of flexible tube members each have first and second open ends. The first open ends of the tube members are connected to the second open ends of the pipe run elbows, respectively. The loop elbows are disposed in a spaced-apart opposing relation, and each has first and second open ends. The first open ends of the loop elbows are connected to the second open ends of the pair of tube members, respectively. Finally, the third flexible tube member is connected between, and to the second open ends of, the loop elbows.

10 Claims, 4 Drawing Sheets

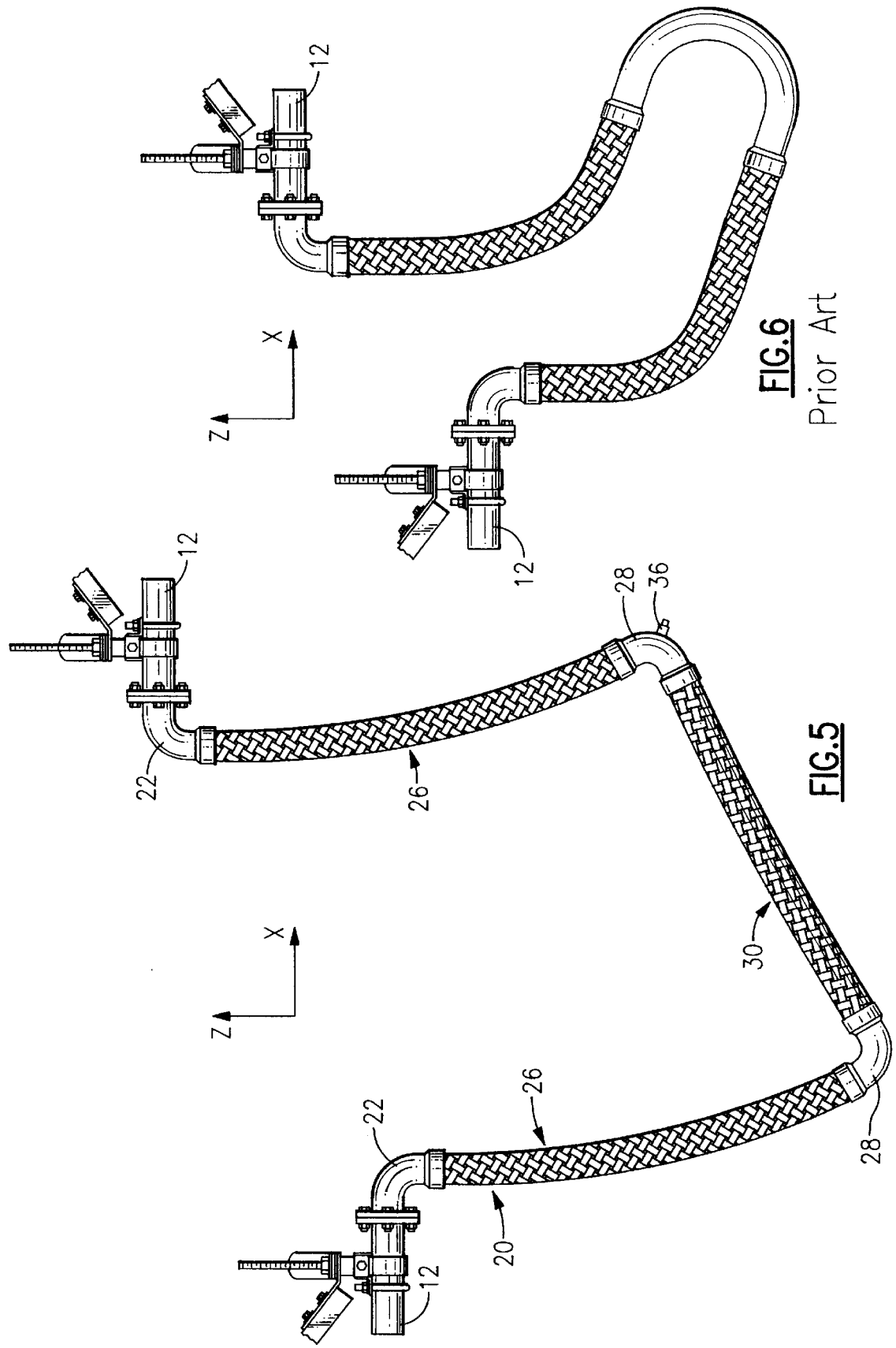

FLEXIBLE PIPE LOOP

BACKGROUND OF THE INVENTION

1. Technical Field

The present invention relates generally to the field of expansion pipe loops, connectors, couplings, unions, and joints used to compensate for and absorb movement in piping systems. The present invention relates more particularly to an improved flexible pipe loop for thermal, seismic and offset applications.

2. Background Art

In many installations involving pipes, there is the inevitable problem of movement of the pipes in the installation. Such movement may be caused by thermal expansion and contraction, random seismic shifts, and offset or misalignment (e.g., settlement) of apparatus to which the pipes are connected. Movement of the pipes in such installations can cause the pipes to leak or break apart. This result can be catastrophic in installations such as gas pipelines, pipelines containing hazardous material, and water supply lines.

Over the years, apparatus have been developed to compensate for and absorb pipe movement in pipe installations. The most common of these apparatus are hard expansion loops, such as shown in U.S. Pat. No. 4,244,543 to Ericson, and bellows type expansion joints, such as shown in U.S. Pat. No. 2,929,397 to Sloan et al. Despite their widespread use, these apparatus suffer from significant drawbacks. For instance, a bellows expansion joint imposes significant anchor or thrust loads on the pipe when the joint is being compressed. Such loads require strong anchors and pipe guides to ensure stability of the installation. Hard expansion loops are large and expensive, requiring elaborate support and guide structures, increased piping and fittings, and plenty of space.

Flexible U-shaped loops have also been employed to compensate for and absorb pipe movements. For example, U.S. Pat. No. 700,378 to Schmidt (1902), U.S. Pat. No. 2,030,218 to Maxwell (1936), and U.S. Pat. No. 5,195,784 to Richter (1993), all disclose such flexible loops. These loops have gained a fair amount of acceptance in the industry, especially with the advent of metal braided corrugated hose as featured in the patent to Richter. However, such flexible loops are limited, in that they are primarily suitable for absorbing axial movements of the pipe.

Pipe movements along the other coordinate axes, especially the "up-and-down" axis, are not as effectively compensated by such flexible loops. In fact, severe stresses are imposed on such loops even with moderate pipe displacement in the up-and-down axis. It is important to note that such pipe displacements are typically experienced during seismic events or from offset or misalignment of installation apparatus. Thus, the flexible loops of Schmidt, Maxwell, and Richter are not optimum for seismic, offset, and misalignment applications.

OBJECTS AND SUMMARY OF THE INVENTION

It is therefore an object of the present invention to overcome the problems associated with the prior art, as discussed above, and to provide an improved flexible pipe loop.

It is another object of the present invention to provide a flexible pipe loop that will absorb and compensate for movement in a pipe run.

It is a further object of the present invention to provide a flexible pipe loop that will absorb and compensate for pipe movement caused by thermal expansion and contraction, random seismic shifts, offset, and misalignment.

It is still another object of the present invention to provide a flexible pipe loop that can effectively and simultaneously absorb and compensates for pipe movement in all three coordinate axes and pipe rotation about those axes.

It is still a further object of the present invention to provide a flexible pipe loop that does not impose significant thrust loads on the pipe run, and thus minimizes the need for heavy anchors and pipe guides.

It is yet another object of the present invention to provide a flexible pipe loop that is not significantly stressed when absorbing pipe movements in the "up-and-down" axis.

It is yet a further object of the present invention to provide a flexible pipe loop that is relatively compact in design, and thus significantly reduces space requirements and eliminates the need for elaborate support and guide structures.

It is still yet another object of the present invention to provide a flexible pipe loop that can compensate for relatively large pipe movements, and thus reduces the required number of compensating or absorbing apparatus in the pipe run.

These and other objects are attained in accordance with the present invention wherein there is provided a novel flexible pipe loop for use in a pipe run. The pipe run is divided at a location along its run to permit installation of the flexible loop. The loop comprises a pair of pipe run elbows, a pair of flexible tube members, a pair of loop elbows, and a third flexible tube member.

The pipe run elbows are oppositely disposed, and each has a first open end to be connected to the pipe run and a second open end. The pair of flexible tube members each have first and second open ends. The first open ends of the tube members are connected to the second open ends of the pipe run elbows, respectively. The loop elbows are arranged in a spaced-apart opposing relation, and each has first and second open ends. The first open ends of the loop elbows are connected to the second open ends of the pair of tube members, respectively. Finally, the third flexible tube member is connected between, and to the second open ends of, the loop elbows. Thus, a complete fluid path is established through the flexible pipe loop.

The first open ends of the pipe run elbows may be configured to couple to, or mate with, the pipe run at the divided location. For example, these ends may include a flange for mating with a like flange on the pipe run. The flexible tube members may be constructed of, for example, a metal or teflon corrugated hose protected by an outer metal braid. At least one of the loop elbows may contain an opening over which a closure is removably secured, for selectively venting gas or draining liquid from the pipe loop.

BRIEF DESCRIPTION OF THE DRAWING

Further objects of the present invention will become apparent from the following description of the preferred embodiment with reference to the accompanying drawing, in which:

FIG. 5 is a side elevation view of the flexible loop of the present invention, showing an up-and-down deflection of the loop;

FIG. 6 is a side elevation view of a prior art flexible loop, showing an up-and-down deflection of the loop;

DETAILED DESCRIPTION OF THE PREFERRED EMBODIMENTS

Figure 1:
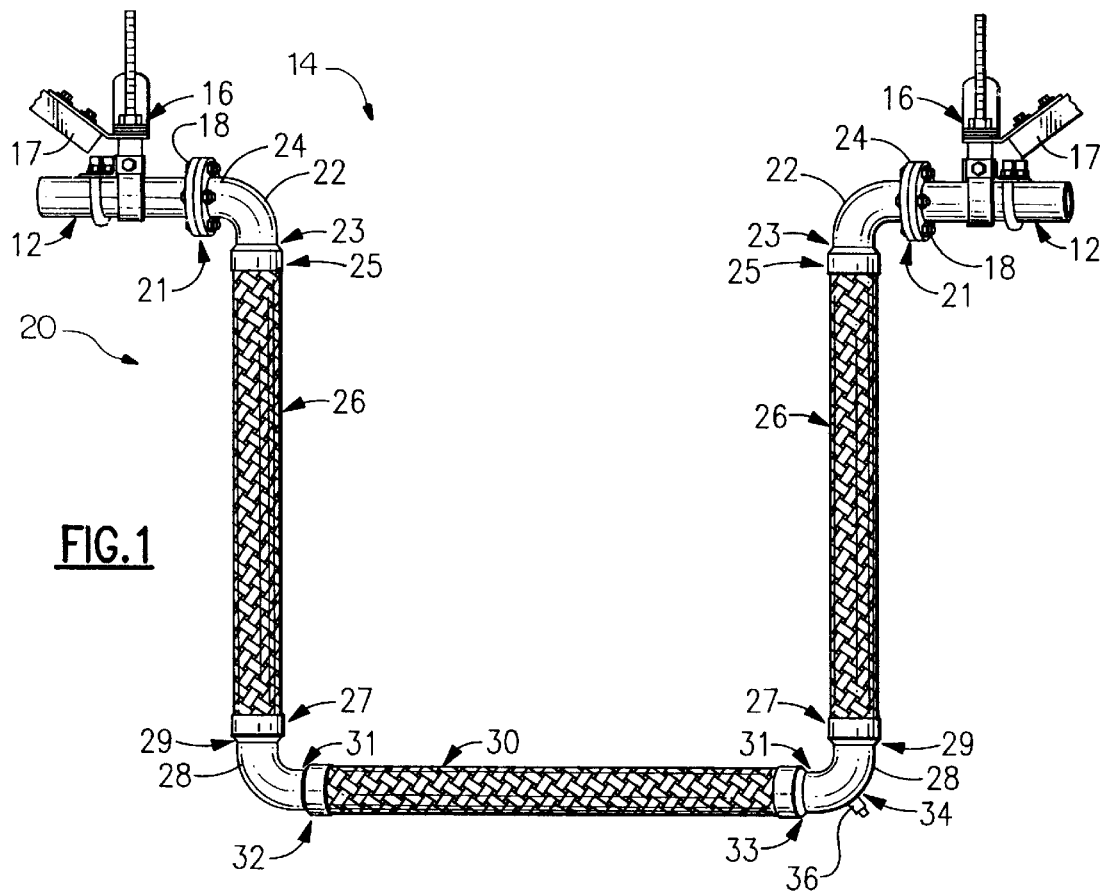
FIG. 1 is a side elevation view of a flexible pipe loop of the present invention, installed in a pipe run.

With reference to FIG. 1, there is shown a flexible pipe loop 20 constructed in accordance with the present invention. Loop 20 is installed in a pipe run 12, at a location 14 where the pipe is divided. Pipe 12 is typically supported by anchors or hanger supports 16 which may, in turn, be braced by seismic braces 17. Pipe guides (not shown) may also be distributed along pipe 12 to provide additional support for and allow axial movement of pipe 12. In this particular installation, pipe 12 includes an end fitting or flange 18 around each of its open ends at location 14.

As shown in FIG. 1, loop 20 comprises a pair of oppositely disposed, 90° pipe run elbows 22. Each elbow 22 has a first open end 21 and a second open end 23. Ends 21 include a metal end fitting or flange 24 to be connected to pipe 12, at location 14. Elbows 22 and fittings 24 are typically made from alloys of carbon steel, stainless steel or bronze. Other types of end fittings may be employed, including male or female pipe threads, weld nipples, swivel unions, slip-on and stub-&-lap-joint flanges, sanitary fittings, flared tube fittings, grooved fittings, or other specially designed connectors, all known in the plumbing art.

Loop 20 further comprises a pair of flexible tube members 26, each having an end 25 and an opposite end 27. Ends 25 are connected to ends 23 of elbows 22, respectively. The connection between elbows 22 and tube members 26 may be, for example, an integral connection, a welded connection, or a crimped connection, depending upon the construction of tube members 26. In the preferred embodiment, tube members 26 are single flexible tubular sections, constructed of metal corrugated hose and braid (See further description below with reference to FIG. 2).

Again referring to FIG. 1, loop 20 further comprises a pair of 90° loop elbows 28, arranged in a spaced-apart opposing relation to each other. Elbows 28 may be made of the same material as elbows 22. Elbows 28 have first open ends 29 and second open ends 31. Ends 29 are connected to ends 27 of tube members 26, respectively. This connection may be made in the same manner as the connection between elbows 22 and tube members 26 (described above).

A third flexible tube member 30 is connected between elbows 28. Tube member 30 has a first end 32 and a second end 33. First and second ends, 32 and 33, are connected to ends 31 of elbows 28, respectively, to complete the construction of loop 20. Again, this connection may be made in the same manner as the connection between elbows 22 and tube members 26. In a complete construction, a fluid-tight path is established through loop 20.

Figure 7:
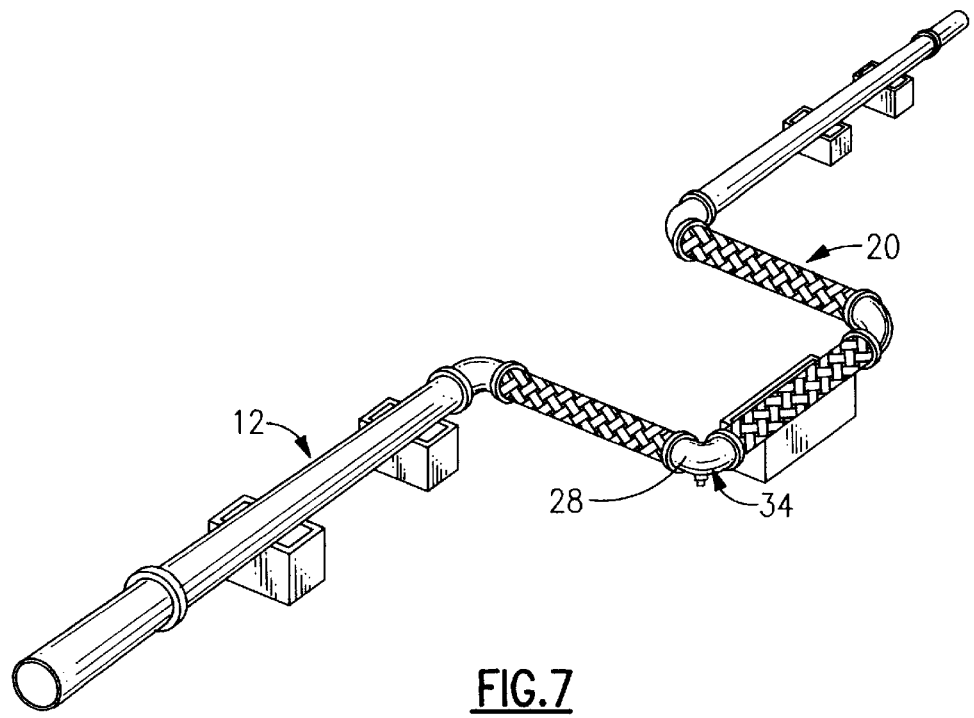
FIG. 7 is a perspective view of the flexible loop of the present invention, installed in a horizontal position in the pipe run.

As represented in FIG. 1, the right side elbow 28 contains an opening 34 over which a closure 36 is removably secured. Typically, closure 36 is a drain plug or air release valve containing an appropriate seal. Opening 34/closure 36 allows one to selectively vent gases or drain liquid from loop 20, depending on the orientation of loop 20 in the pipe installation. For example, if loop 20 is in the orientation shown in FIG. 1, opening 34 is used to drain liquids. If loop 20 is in a reverse orientation (i.e., vertically upward), opening 34 is used to vent gases. If loop 20 is intended for a horizontal installation, as shown in FIG. 7, opening 34 may be located on the side of elbow 28 (See FIG. 7), so that it can be directed downward for drainage or upward to support a gauge.

It is apparent from the above description that loop 20 is relatively compact in design, as compared to hard pipe loops. Such compactness reduces space requirements for the installation and eliminates the need for elaborate support and guide structures.

Figure 2:
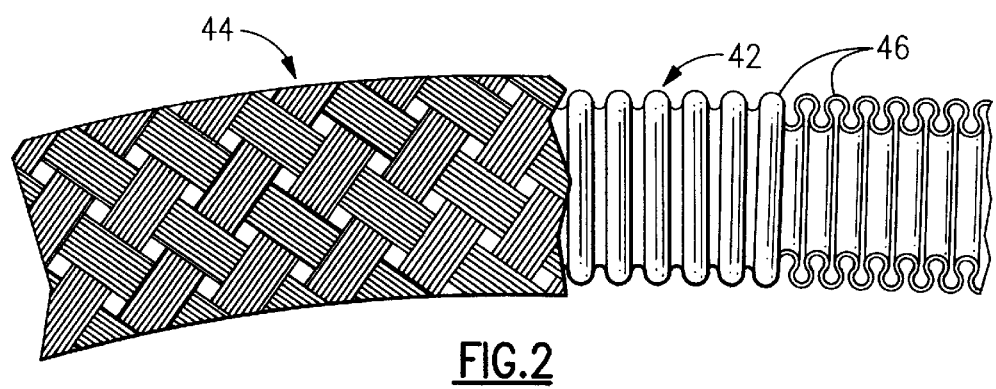
FIG. 2 is an enlarged cut-away view, showing a corrugated and braided construction for a flexible tube member of the present invention.

Referring now to FIG. 2, there is shown the preferred construction of flexible tube members 26, 30. Each tube member preferably consists of a single flexible tubular section, constructed as shown in FIG. 2. An annular corrugated metal hose 42 is covered and protected by a metal braided sheath 44. Hose 42 comprises a series of integrally formed annular corrugations 46. The corrugations enable hose 42 to flex without exceeding its elastic limit. Braid 44 is a tubular sheath of metal wires woven in a "basket weave" manner. Braid 44 fits snugly over hose 42 and is fastened to the ends of the hose. Braid 44 flexes with hose 42 and prevents elongation of the hose under pressure. Braid 44 should be strong enough to withstand elongation for the full pressure rating of hose 42. In an alternative construction, hose 42 may have helical, rather than annular, corrugations.

Suitable metals for hose 42 and braid 44 are those having properties of high strength and high resistance to temperature and corrosion, yet having the ability to flex. Typical metals for hose 42 and braid 44 include alloys of stainless steel, bronze, and monel. Hose 42 may also be made of teflon covered by a metal braid, which is a construction particularly suited for chemical applications. Such metal braided corrugated hose (metal or teflon hose) is commercially available from a number of sources including FLEX-HOSE CO., INC., East Syracuse, N.Y.

Figure 3:
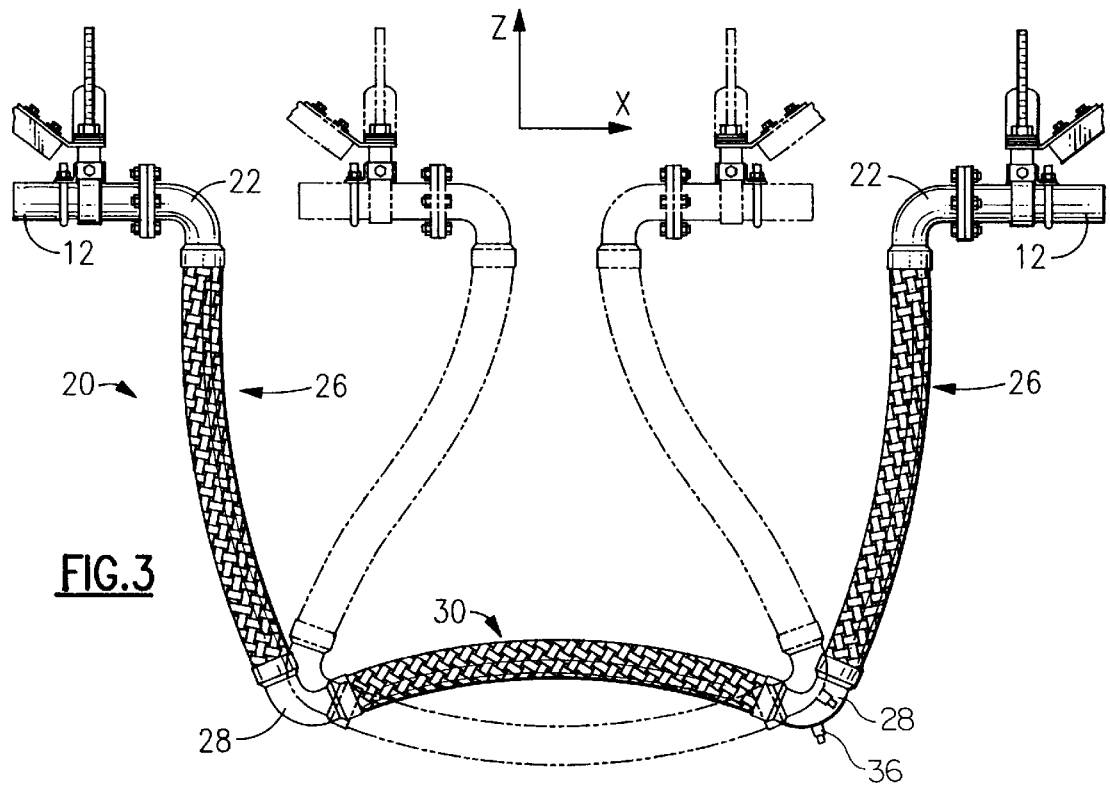
FIG. 3 is a side elevation view of the flexible pipe loop, showing positive and negative deflection of the loop resulting from axial movement of the pipe run.

Referring now to FIGS. 3–5, the operation of flexible pipe loop 20 will now be described and compared with that of the prior art. FIG. 3 shows loop 20 in an expanded condition (solid lines) and a compressed condition (phantom lines). These two conditions are caused by simple axial movement of pipe run 12 (i.e., expansion and contraction). Such movement typically results from temperature variations—thermal expansion and contraction of pipe run 12. As shown and defined in FIG. 3, the deflection of loop 20 primarily occurs parallel to the "x" axis in the x,z plane of an x,y,z coordinate system. There is some deflection of tube member 30 in the direction of the "z" axis.

As shown in FIG. 3, the "x" axis deflection of loop 20 is significant, and demonstrates the capability of loop 20 to absorb and compensate large axial movements of pipe run 12. This capability translates to a reduction of the number of compensating or absorbing apparatus that would otherwise be required for pipe run 12. In addition, due to the exceptional flexibility (i.e., relatively low spring rate) of loop 20, no significant thrust loads are imposed on pipe run 12, thus minimizing the need for heavy anchors and pipe guides in the installation.

Figures 4A, 4B:
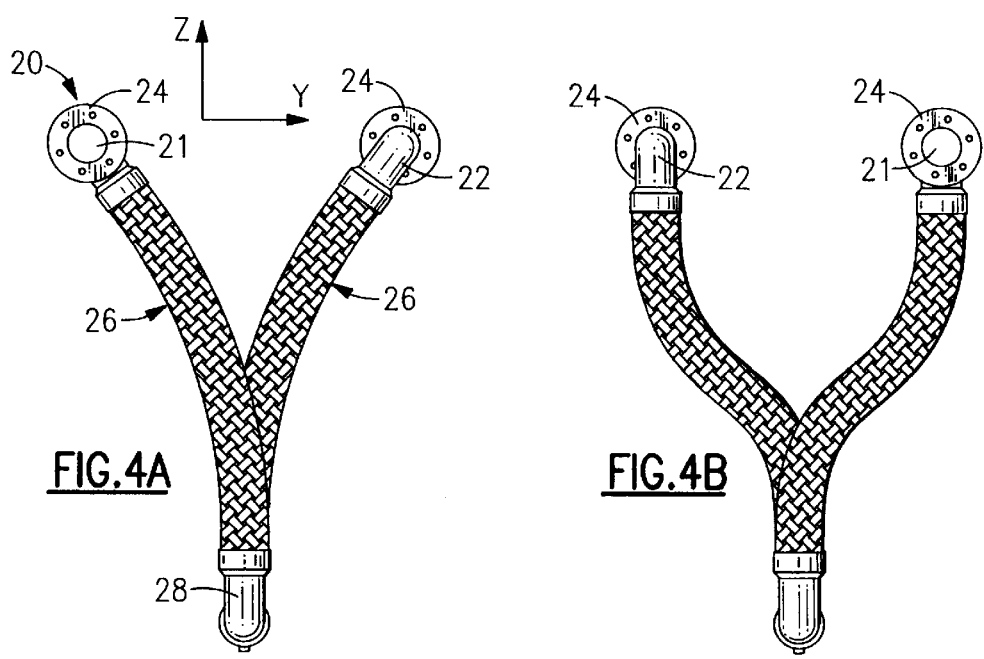
FIG. 4A is an end elevation view of the flexible pipe loop, showing a side-to-side deflection of the loop as well as rotation about the "x" axis.
FIG. 4B is an end elevation view of the flexible pipe loop, showing a side-to-side deflection of the loop caused by lateral pipe movement.

Referring now to FIG. 4A, flexible loop 20 is shown deflected along the "y" axis in the y,z plane, as a result of simple rotation of the end fittings. This deflected position simulates a situation, e.g., where a tank, to which loop 20 is connected, rotates as the tank's footing settles. As shown in FIG. 4A, tube members 26 flex in opposite directions to achieve a significant deflection along the "y" axis.

Referring now to FIG. 4B, flexible loop 20 is shown deflected along the "y" axis in the y,z plane, as a result lateral displacement of pipe run 12. Tube members 26 flex in opposing "S" configurations to achieve, again, a significant deflection along the "y" axis. This "y" axis deflection capability shown in FIGS. 4A and 4B, demonstrates the versatility of loop 20, as compared to hard pipe loops and expansion joints.

Referring now to FIG. 5, flexible loop 20 is shown in the x,z plane, with a significant deflection parallel to the "z" axis. The "z" axis is the same as the "up-and-down" axis referred to above. Note how loop 20 is able to absorb and compensate for "z" axis movement of pipe run 12, without imposing significant bending forces on flexible members 26, 30. This ability is contrasted with that of a prior art flexible loop shown in FIG. 6, and described in U.S. Pat. No. 5,195,784 to Richter.

As shown in FIG. 6, the prior art loop is attempting to absorb the same amount of "z" axis displacement of pipe 12 as experienced by loop 20 (in FIG. 5). Notice the significant bending forces imposed on the flexible members of the prior art loop. If the "z" axis displacement is great enough, these forces will be great enough to cause premature failure of the loop (i.e., the flexible members or their connections will rupture or pull apart). Also, in the position shown in FIG. 6, the prior art loop imposes significant bending moments on pipe run 12.

"Z" axis displacement of pipe run 12 is a typical scenario in seismic, offset and misalignment applications. Thus, loop 20, with its great ability to absorb and compensate for movement in the "z" axis, is uniquely suited for such applications.

One may question whether a flexible loop, such as shown in U.S. Pat. No. 2,511,335 to Guarnaschelli, would be suitable for the applications described herein. The answer is no. The flexible loop shown in Guarnaschelli would be subject to bending and torsional forces concentrated at the bend (or return) of the loop. This concentration of force will result in failure of the loop at the bend or return. In the present invention, loop elbows 28 serve as isolators or buffers, protecting flexible tube member 30 from such concentration of forces.

Referring now to FIG. 7, there is shown flexible pipe loop 20 installed in a horizontal position in pipe run 12. Loop 20 functions similarly in this position as it does in the vertical positions shown in FIGS. 3–5. FIG. 7 illustrates that the flexible pipe loop of the present invention is not limited to any particular operational orientation.

Loop 20 may be installed in a neutral condition, as shown in FIG. 1, or may be pre-extended or pre-compressed depending on the application. For example, if loop 20 is to be installed in a normally hot pipe line, it may be pre-extended (as shown in FIG. 3). Loop 20 will then be compressed to its neutral condition, as shown in FIG. 1. Thus, in those applications where pipe movement is predictable, a pre-deflection of loop 20 will maximize the loop's compensation ability.

Figure 8:
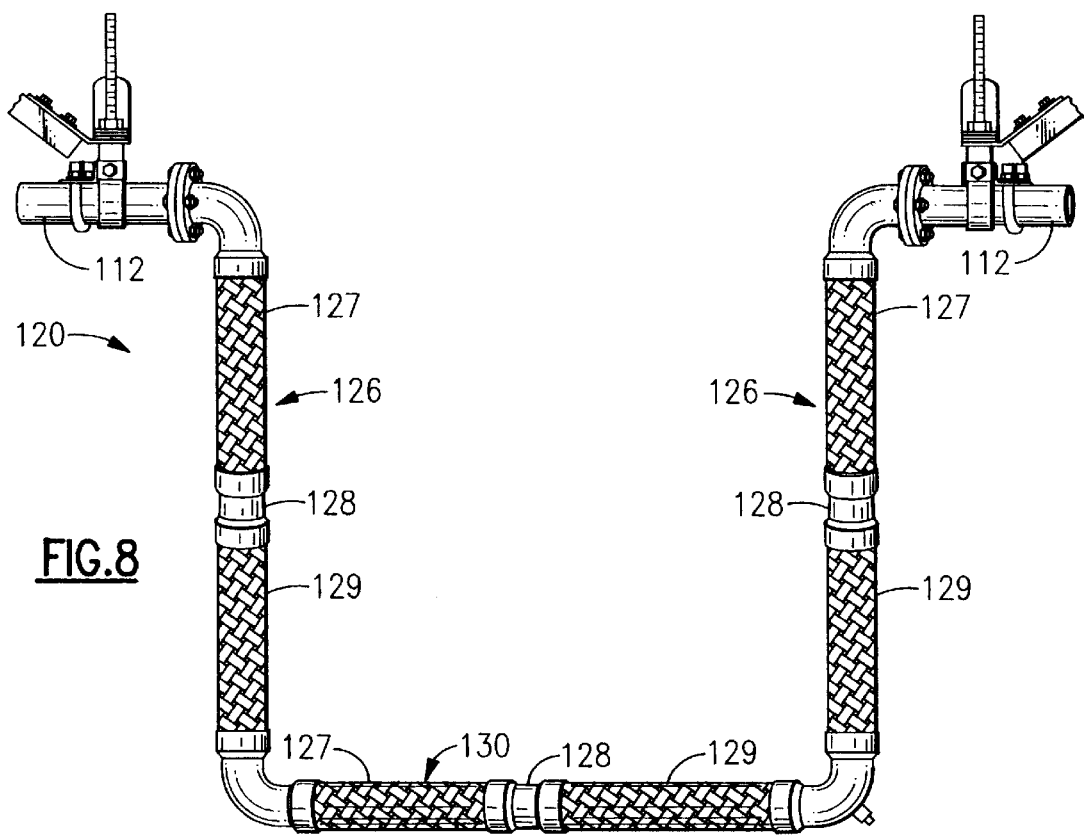
FIG. 8 is a side elevation view of a second embodiment of the present invention, installed in a pipe run.

Referring now to FIG. 8, there is shown a second embodiment of the present invention. A flexible pipe loop 120, constructed in accordance with the present invention, is installed in a pipe run 112. Loop 120 is constructed in the same manner as loop 20, except for its flexible tube members. Loop 120 comprises a pair of flexible tube members 126 and a third flexible tube member 130. Each of these tube members includes two flexible tubular sections 127 and 129, which are connected to a common metal spool piece 128. Tubular sections 127 and 129 are preferably metal braided corrugated hose.

From the above description, it is understood that flexible loop 20 has six degrees of freedom to absorb and compensate for pipe movements along the three coordinate axes and pipe rotation about these axes, simultaneously.

While the preferred embodiments of the invention have been particularly described in the specification and illustrated in the drawing, it should be understood that the invention is not so limited. Many modifications, equivalents, and adaptations of the invention will become apparent to those skilled in the art without departing from the spirit and scope of the invention as defined in the appended claims.

We claim:

1. A flexible pipe loop for use in a pipe run which is divided at a location along its run, said loop comprising:

a pair of oppositely disposed pipe run elbows, each having a first open end to be connected to the pipe run at the divided location, and each having a second open end;

a pair of flexible tube members each having first and second open ends, the first open ends of said pair of tube members being connected to the second open ends of said pipe run elbows, respectively;

a pair of loop elbows, disposed in a spaced-apart opposing relation, and each having first and second open ends, the first open ends of said pair of loop elbows being connected to the second open ends of said pair of flexible tube members, respectively; and a third flexible tube member connected between, and to the second open ends of, said pair of loop elbows, whereby a complete fluid path is established through said flexible pipe loop.

2. The flexible pipe loop of claim 1, wherein the first open ends of said pair of pipe run elbows are each configured and dimensioned to couple to the pipe run at the divided location.

3. The flexible pipe loop of claim 2, wherein each of the first open ends of said pipe run elbows includes a flange for coupling to a like flange on the pipe run.

4. The flexible pipe loop of claim 1, wherein each of said pair of flexible tube members consists of a single flexible tubular section.

5. The flexible pipe loop of claim 4, wherein said third flexible tube member consists of a single flexible tubular section.

6. The flexible pipe loop of claim 5, wherein the tubular section of each of said tube members is a corrugated metal hose covered by a metal braid.

7. The flexible pipe loop of claim 1, wherein each of said pair of flexible tube members includes a plurality of flexible tubular sections.

8. The flexible pipe loop of claim 7, wherein said third flexible tube member includes a plurality of flexible tubular sections.

9. The flexible pipe loop of claim 8, wherein each of the tubular sections of said tube members is a corrugated metal hose covered by a metal braid.

10. The flexible pipe loop of claim 1, wherein at least one of said pair of loop elbows contains an opening over which a closure is removably secured, for selectively venting gas or draining liquid from said pipe loop.

* * * * *